US007006271B2

(12) United States Patent
Ono et al.

(10) Patent No.: US 7,006,271 B2
(45) Date of Patent: Feb. 28, 2006

(54) OPTICAL SCANNING DEVICE AND IMAGE FORMING APPARATUS

(75) Inventors: Nobuaki Ono, Kanagawa (JP); Akihisa Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 129 days.

(21) Appl. No.: 09/827,097

(22) Filed: Apr. 6, 2001

(65) Prior Publication Data

US 2001/0035493 A1 Nov. 1, 2001

(30) Foreign Application Priority Data

Apr. 13, 2000 (JP) ....................................... 2000-111729
Jun. 15, 2000 (JP) ....................................... 2000-180391

(51) Int. Cl.
*G02B 26/08* (2006.01)

(52) U.S. Cl. ....................................... 359/212; 359/822
(58) Field of Classification Search ................. 359/217, 359/216, 822, 819, 212; 347/257, 259, 260, 347/261
See application file for complete search history.

(56) References Cited

U.S. PATENT DOCUMENTS 4,726,640 A 2/1988 Iwama et al.
5,017,987 A 5/1991 Nanjoh et al.
5,069,515 A 12/1991 Itami et al.
5,108,843 A 4/1992 Ohtaka et al.
5,220,449 A * 6/1993 Kuroda ....................... 359/196
5,304,357 A 4/1994 Sato et al.
5,408,113 A 4/1995 Kanno et al.
5,448,113 A 9/1995 Suzuki et al.
5,453,650 A 9/1995 Hashimoto et al.
5,459,601 A 10/1995 Suzuki et al.
5,508,477 A 4/1996 Kato et al.
5,510,664 A 4/1996 Suzuki et al.
5,546,216 A 8/1996 Suzuki
5,557,448 A 9/1996 Endo et al.
5,570,224 A 10/1996 Endo et al.
5,574,591 A 11/1996 Suzuki et al.
5,581,392 A 12/1996 Hayashi
5,606,448 A 2/1997 Suzuki et al.
5,612,599 A 3/1997 Itami et al.
5,633,523 A 5/1997 Kato
5,633,744 A 5/1997 Nakajima
5,652,670 A 7/1997 Hayashi
5,668,413 A 9/1997 Nanjo
5,717,511 A 2/1998 Suzuki (Continued)

FOREIGN PATENT DOCUMENTS

JP 2550153 8/1996
JP 11-218715 8/1999

*Primary Examiner*—Euncha P. Cherry
(74) *Attorney, Agent, or Firm*—Oblon, Spivak, McClelland, Maier & Neustadt, P.C.

(57) ABSTRACT

A coupling lens couples a beam emitted from a light source. A light deflector deflects the beam from the coupling lens at a uniform angular velocity. A line-image imaging optical system is disposed between the coupling lens and light deflector, and causes the beam to image a line image long along main scanning directions on or in the vicinity of a deflection reflective surface of the light deflector. A scanning and imaging optical system causes the beam deflected by the light deflector to image a beam spot on a medium to be scanned. In an optical housing, the light source, coupling lens, light deflector, line-image imaging optical system and scanning and imaging optical system are disposed, and contained. A plurality of holding and fixing locations are provided for holding and fixing a light-source part including the light source and coupling lens is provided in at least one of the light-source part and optical housing.

21 Claims, 12 Drawing Sheets

U.S. PATENT DOCUMENTS

| | | | | |
|---|---|---|---|---|
| 5,726,699 | A | | 3/1998 | Itami et al. |
| 5,739,602 | A | | 4/1998 | Suzuki et al. |
| 5,753,907 | A | | 5/1998 | Nakajima et al. |
| 5,769,544 | A | | 6/1998 | Suzuki et al. |
| 5,786,594 | A | | 7/1998 | Ito et al. |
| 5,793,408 | A | | 8/1998 | Nakajima |
| 5,811,353 | A | | 9/1998 | Nanjo |
| 5,875,051 | A | | 2/1999 | Suzuki et al. |
| 5,909,966 | A | | 6/1999 | Suzuki et al. |
| 5,936,756 | A | | 8/1999 | Nakajima |
| 5,969,844 | A | | 10/1999 | Itami et al. |
| 5,986,791 | A | | 11/1999 | Suzuki et al. |
| 5,999,345 | A | | 12/1999 | Nakajima et al. |
| 6,052,211 | A | | 4/2000 | Nakajima |
| 6,061,190 | A | * | 5/2000 | Kane et al. ................ 359/811 |
| 6,069,724 | A | | 5/2000 | Hayashi et al. |
| 6,081,386 | A | | 6/2000 | Hayashi et al. |
| 6,091,534 | A | | 7/2000 | Nakajima |
| 6,104,522 | A | | 8/2000 | Hayashi et al. |
| 6,130,768 | A | | 10/2000 | Ono |
| 6,141,133 | A | | 10/2000 | Suzuki et al. |
| 6,150,698 | A | | 11/2000 | Ohtsuka et al. |
| 6,150,779 | A | | 11/2000 | Itami et al. |
| 6,157,478 | A | * | 12/2000 | Naiki et al. ................ 359/204 |
| 6,185,026 | B1 | | 2/2001 | Hayashi et al. |
| 6,198,562 | B1 | | 3/2001 | Hayashi et al. |
| 6,215,974 | B1 | | 4/2001 | Katoh et al. |
| 6,222,662 | B1 | | 4/2001 | Suzuki et al. |
| 6,229,638 | B1 | | 5/2001 | Sakai et al. |
| 6,233,081 | B1 | | 5/2001 | Suzuki et al. |
| 6,256,133 | B1 | | 7/2001 | Suzuki et al. |
| 6,281,609 | B1 | | 8/2001 | Itami et al. |
| 6,312,108 | B1 | | 11/2001 | Kato |
| 6,324,149 | B1 | | 11/2001 | Mifune et al. |
| 6,332,669 | B1 | | 12/2001 | Kato et al. |
| 6,347,004 | B1 | | 2/2002 | Suzuki et al. |
| 6,359,717 | B1 | | 3/2002 | Suzuki et al. |
| 6,367,914 | B1 | | 4/2002 | Ohtaka et al. |
| 6,381,057 | B1 | | 4/2002 | Itabashi |
| 6,429,956 | B1 | | 8/2002 | Itabashi |
| 6,465,918 | B1 | | 10/2002 | Itami et al. |
| 6,469,772 | B1 | | 10/2002 | Itabashi |

* cited by examiner

FLOATING AMOUNT $C1' = b \cos u$

BEAM-AXIS DEVIATION AMOUNT $C1 = b \sin u$ $$b = d \times \left(1 - \frac{\cos u}{\sqrt{n^2 - \sin^2 u}}\right)$$

FLOATING AMOUNT $C2' = b' \cos u'$

BEAM-AXIS DEVIATION AMOUNT $C2 = b' \sin u'$ $$b' = d \times \left(1 - \frac{\cos u'}{\sqrt{n^2 - \sin^2 u'}}\right)$$

OPTICAL SCANNING DEVICE AND IMAGE FORMING APPARATUS

BACKGROUND OF THE INVENTION

1. Field of the Invention

The present invention generally relates to an optical scanning device and an image forming apparatus used in a digital copier, a laser facsimile machine, a laser printer, a laser plotter and so forth, and, in particular, to an optical scanning device and an image forming apparatus in which the optical scanning device can easily be adapted to a case where a cover member is mounted on an incident/exit window of a cover covering a light deflector, and an optical scanning device and an image forming apparatus for which a plurality of units are used in common among different types of devices/apparatuses.

2. Description of the Related Art

Recently, in an optical scanning device employed as a writing system of an image forming apparatus such as a digital copier, a laser printer, a laser facsimile or the like, improvement in a recording speed is demanded. In order to improve the recording speed, there is a method of increasing a deflection speed of a light deflector such as a polygon mirror, that is, to increase a rotation speed of the polygon mirror. However, in this method, a noise generated by the light deflector, in particular, in the case of the polygon mirror, a zipping noise generated by edges/corners of the polygon mirror increases. Accordingly, it is necessary to provide a measure to lower the noise.

As a measure to lower the noise, in general, a cover covering the light deflector is used. In this case, an incident/exit window for allowing a beam to be incident on the light deflector therethrough and also the deflected beam to exit therefrom is covered by a transparent cover such as a glass. Thereby, it is possible to prevent the noise generated by the light deflector from leaking externally. Further, this measure can also be used as a measure to prevent external dust from adhering to the light deflector.

On the other hand, an inexpensive optical scanning device in which the recording speed is low, and an image forming apparatus employing such an optical scanning device have also been developed. In such a situation, if both an optical system aiming improvement in recording speed and an optical system aiming reduction of costs even with a low recording speed are developed independently, time is required for developing each of both systems, and, also, costs are required for each thereof. In order to solve this problem, use of an optical system having a common configuration is used for both systems in which a transparent cover for soundproof and dustproof is provided in the optical scanning device for high recording speed, while the same is not provided for the optical scanning device for low recording speed is considered.

However, the transparent cover having the soundproof and dustproof functions has a refractive function. Accordingly, when this transparent cover is used, a path of a beam is different in comparison to a case where the same is not used. Thus, a so-called 'floating' occurs. Thereby, it is necessary to employ different layouts of respective optical components between the device using the transparent cover and the device not using the same. Therefore, different optical housings are needed to be provided for the respective devices. However, these different optical housings need different dies for molding them. Accordingly, the development costs increase.

Also in an image forming apparatus such as a digital copier, a laser facsimile machine, a laser printer or a laser plotter, development is proceeded with such that units used inside can be used in common among different types of devices/apparatuses. By using units in common, it is possible not only to increase productivity so as to reduce the costs but also to contribute to global environmental protection because industrial waste can be reduced.

With regard to an optical scanning device, in many cases, a scanning lens system is used in common among different types of devices. However, according to prices and specifications of devices/apparatuses, scanning speeds may be different from each other. In an optical scanning device of a high scanning speed, a rotation speed of a light deflector should be increased. In such a case, as mentioned above, a transparent cover for sound proof is needed.

On the other hand, even using the same scanning lens system, in an optical scanning device of a low scanning speed, a rotation speed of a light deflector should not be increased. Therefore, in such an optical scanning device, the transparent cover for sound proof is not needed as mentioned above. However, there are cases where, also in such an optical scanning device of a low scanning speed, the transparent cover is used as a measure for dustproof of the light deflector.

Further, Japanese Laid-Open Patent Application No. 11-218715 discloses an optical scanning device in which, when a beam from a light source is directed to a deflector (polygon mirror), adjustment of a light path in a main scanning direction of the beam is enabled by translation in a z-axis of two mirrors disposed between the light source and polygon mirror.

As mentioned above, in the related art, when units of an optical scanning device are used in common among different types of the devices, a position of imaging of a beam is different according to whether or not a transparent cover for soundproof and dustproof is provided. Accordingly, it becomes not possible to precisely image from the beam onto a surface to be scanned.

SUMMARY OF THE INVENTION

An object of the present invention is to enable to use an optical housing in common between a case where a transparent cover member for soundproof and dustproof is used and a case where the same is not used.

When the transparent cover member is used, because floating occurs due to the refractive function thereof, the imaging position is shifted according to whether or not the transparent cover member is used. Thereby, the imaging position along the sub-scanning directions is shifted at the medium to be scanned. Thereby, the image quality is degraded. In order to solve this problem, it is necessary to change the position of the line-image imaging optical system according to whether or not the transparent cover member is used.

Accordingly, another object of the present invention is to dispose the light-source part and line-image imaging optical system on a common member, and thus, the light-source part and line-image imaging optical system can be positioned simultaneously.

As the position of the light-source part and line-image imaging optical system is thus substantially integrally changed, the distance between the light-source part and light deflector is changed accordingly. When the beam from the light-source part is a divergent beam or a convergent beam, the imaging position at the medium to be scanned in the main scanning directions is changed as the distance between the light-source part and light deflector is changed. Thereby, a problematic situation such as an increase of beam diameter occurs due to deviation of an imaging position.

Accordingly, another object of the present invention is to provide an optical scanning device in which, even if the distance between the light-source part and light deflector is changed, deviation of imaging position can be prevented.

Another object of the present invention is to reduce the number of parts and to miniaturize the movable part by configuring the coupling lens and line-image imaging optical system into a single lens.

Another object of the present invention is to have a plurality of light-emitting sources in the light-source part, thus to increase the number of scan lines, and to increase the speed of optical writing accordingly.

Another object of the present invention is to provide an optical scanning device and an image forming apparatus employing the optical scanning device through which the beam can be used for precisely imaging on the surface to be scanned whether or not the transparent cover for soundproof and dustproof is provided.

An optical scanning device according to the present invention comprises:

a light source;

a coupling lens coupling a beam emitted from the light source;

a light deflector deflecting the beam from the coupling lens at a uniform angular velocity;

a line-image imaging optical system disposed between the coupling lens and light deflector, and causing the beam to image a line image long along main scanning directions on or in the vicinity of a deflection reflective surface of the light deflector;

a scanning and imaging optical system causing the beam deflected by the light deflector to image a beam spot on a medium to be scanned; and an optical housing in which the light source, coupling lens, light deflector, line-image imaging optical system and scanning and imaging optical system are disposed, and contained, and wherein a plurality of holding and fixing locations for holding and fixing a light-source part comprising the light source and coupling lens are provided in at least one of the light-source part and optical housing.

The light deflector may be covered by a cover;

the cover may have a window for the beam to be incident on and exit from the light deflector; and a transparent cover member may be able to be mounted on the window, and wherein the holding and fixing locations are determined so that, by selectably using the holding and fixing locations, the beam deflected by the light deflector passes through the scanning and imaging optical system approximately at the same position whether or not the transparent cover member is mounted.

Thereby, because the plurality of holding and fixing locations are provided and are selectably used according to whether or not the transparent cover is mounted, it is possible that the configuration of the optical system and the configuration of the optical housing are used in common between a machine/configuration for high-speed writing using the transparent cover covering the entirety of the light deflector and a machine/configuration for low-speed writing not using the transparent cover. In fact, one of the plurality of locations is used for the machine for high-speed writing and the other thereof is used for the machine for low-speed writing. Thereby, it is possible to cancel the influence of the transparent cover member. As a result, it is possible to reduce costs for development of the optical scanning device, and, also, shorten a time therefor. Further, by using the housing in common, only a single die for molding it is needed. Thereby, also costs can be effectively reduced.

The light-source part and line-image imaging optical system may be disposed on a common member.

Thereby, these components can be moved integrally. Thereby, it is possible to correct a shift of imaging position along the sub-scanning directions occurring due to whether or not the transparent cover member is used. Further, as the light-source part and line-image imaging optical system are integrated, assembling work, adjustment work and so forth can be simplified.

The coupling lens and line-image imaging optical system may be formed integrally.

Thereby, the number of components/parts can be reduced, the components can be reduced in size, and resources/materials can be saved.

The light-source part may include a plurality of light-emitting sources.

Thereby, it is possible to further increase the speed in optical writing/forming an image.

The beam emitted from the light-source part may be an approximately parallel beam.

Thereby, it is possible to eliminate a shift of imaging position along the main scanning directions due to whether or not the transparent cover is used.

An optical scanning device according to another aspect of the present invention comprises:

a light-source unit emitting a beam;

a first imaging optical system causing the beam emitted by the light-source unit to image at a predetermined position;

a deflector receiving the beam from the first imaging optical system and performing scanning with the beam; and a second imaging optical system causing the beam from the deflector to image a beam spot on a surface to be scanned, and wherein:

the light-source unit, first imaging optical system, deflector and second imaging optical system are mounted in a box housing;

a transparent member of an approximately parallel plate is disposed detachably so as to be located between the first imaging optical system and deflector and between the deflector and second imaging optical system; and a mounting position of the second imaging optical system can be changed according to whether or not the transparent member is used.

Thereby, when a plurality of units are used in common among different types of devices, it is possible to image a beam spot from a beam on a surface to be scanned precisely, whether or not the transparent member for soundproof and dustproof is used.

The mounting position of the second imaging optical system along main scanning directions may be able to be changed according to whether or not the transparent member is used.

Thereby, it is possible to reduce a deviation of a beam axis (optical-axis deviation) along the main scanning directions.

The mounting position of the second imaging optical system along directions of an optical axis thereof may be able to be changed according to whether or not the transparent member is used.

Thereby, it is possible to reduce a floating amount of an optical image along directions of beam axis.

The mounting position of the second imaging optical system along the main scanning directions and directions of optical axis thereof may be able to be changed according to whether or not the transparent member is used.

Thereby, it is possible to reduce both a deviation of beam axis along the main scanning directions and a floating amount of an optical image along the directions of beam axis.

Further, the present invention can be applied to equipment/machines such as a digital copier, a laser facsimile machine, a laser printer, a laser plotter, and so forth. Then, because units used internally can be used in common among different types of devices as mentioned above, productivity is improved and costs can be reduced, and, also, it is possible to contribute to global environmental protection because industrial waste can be reduced accordingly.

Other objects and further features of the present invention will become more apparent from the following detailed description when read in conjunction with the accompanying drawings.

DETAILED DESCRIPTION OF THE PREFERRED EMBODIMENTS

Figure 1:
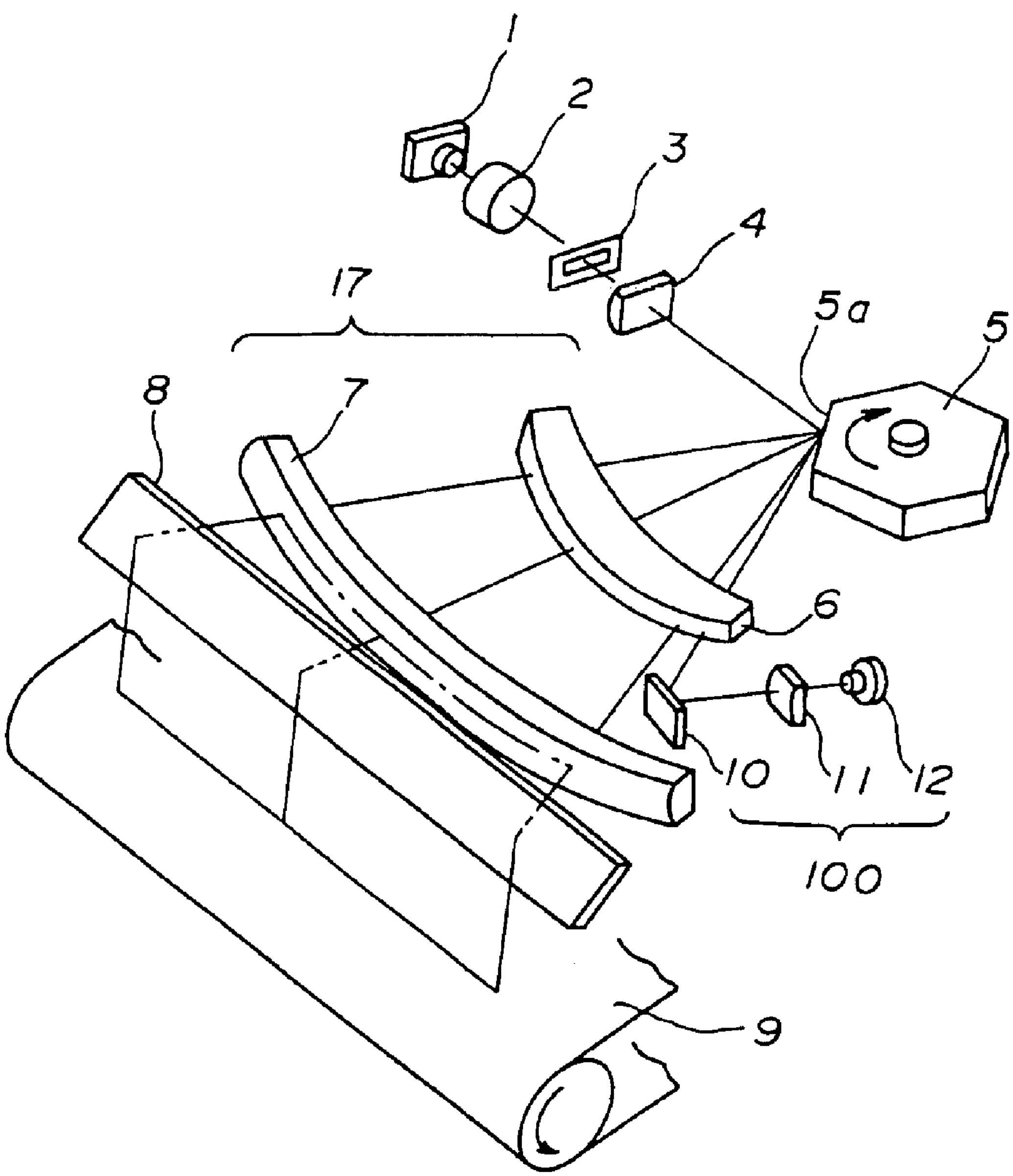
FIG. 1 shows a perspective view of an optical scanning device to which each of first, second and third embodiment of a first aspect of the present invention can be applied.

FIG. 1 shows a perspective view of an optical scanning device in each of first, second and third embodiments of a first aspect of the present invention.

As shown in the figure, the optical scanning device includes a light source 1 of a semiconductor laser, for example, and a coupling lens 2. A divergent beam emitted from the light source 1 is coupled by the coupling lens 2, and thus, is condensed thereby. Then, the beam is shaped by an aperture 3 acting as a beam shaping part so as to have a predetermined shape in cross section. A cylindrical lens 4 acting as a line-image imaging optical system is disposed on a light path of the beam having passed the aperture 3. Further, a light deflector 5 of a polygon mirror is disposed at a position which the beam having passed through the cylindrical lens 4 reaches.

The cylindrical lens 4 condenses the beam having passed through the aperture 3 only along sub-scanning directions. Thereby, the beam is used for imaging a line image long along main scanning directions on or in the vicinity of a deflection reflective surface of the light deflector 5. The light deflector 5 deflects the incident beam for a predetermined angle range at a uniform angular velocity. The thus-deflected beam passes through a scanning and imaging optical system 17, and is used for scanning a medium to be scanned 9. The medium to be scanned 9 is of a photoconductive photosensitive body. The scanning and imaging optical system 17 includes an imaging lens 6 and a long-dimensional lens 7 long along the main scanning directions. The scanning and imaging optical system 17 causes the beam deflected by the light deflector 5 at the uniform angular velocity to image a beam spot on the medium to be scanned 9, and, also, to scan the medium to be scanned 9 at a uniform velocity. A long-dimensional mirror 8 bending a light path of the beam is disposed between the scanning and imaging optical system 17 and medium to be scanned 9.

As shown in FIG. 1, the optical scanning device includes a synchronization detecting optical system 100. The synchronization detecting optical system 100 includes a mirror 10, a lens 11, and a photoelectric device 12. The mirror 10 is disposed between the above-mentioned imaging lens 6 and the long-dimensional lens 7, and reflects the beam in the vicinity of a deflection beginning end, toward the lens 11 and photoelectric device 12. The photoelectric device 12 detects the beam in the vicinity of the deflection beginning end, and outputs a signal. This signal is, as well-known, used for determining a writing beginning timing as a synchronization signal.

An optical system including the above-mentioned light source 1, coupling lens 2, light deflector 5, line-image imaging optical system 4, scanning and imaging optical system 17, long-dimensional mirror 8 and synchronization detecting optical system 100 is positioned at a predetermined position of an optical housing, not shown in the figure, and is enclosed thereby.

Figure 2:
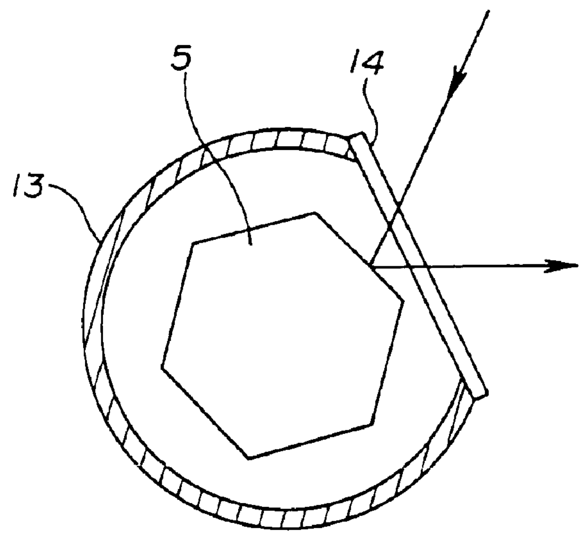
FIG. 2 shows a cross-sectional view of a light deflector, a cover and a transparent cover member of each of the first, second and third embodiment of the first aspect of the present invention.

The configuration of the optical scanning device shown in FIG. 1 is basically the same whether the device is used for either high-speed scanning or low-speed scanning. However, when the device is used for high-speed scanning, the light deflector 5 (polygon mirror) is rotated at a relatively high speed, as mentioned above. Accordingly, a zipping sound generated from the high-speed rotation thereof may be a problematic noise, as mentioned above. In order to solve this problem, as shown in FIG. 2, the entirety of the light deflector 5 is covered by a cylindrical cover 13 for the purpose of soundproof. The cover 13 has a window through which the beam to be incident on the light deflector 5 passes and the thus-deflected beam exits from the cover 13. This window is covered by a transparent cover member 14 when the optical scanning device is used for high-speed scanning. Thereby, the noise generated by the light deflector 5 rotating at high speed is prevented from leaking externally.

Whether or not the above-mentioned cover member 14 is used, almost all of the light deflector 5, imaging lens 6, long-dimensional lens 7 and so forth are used in common. However, as the transparent cover member 14 is disposed on the light path of the optical system, the light path is shifted through the cover member 14 due to a phenomenon called 'floating'. As a result, the positions of the beam at which the beam passes through the imaging lens 6 and long-dimensional lens 7 are changed by the cover member 14. Thereby, a position at which imaging is made by the beam is shifted as if the optical system disposed between the light deflector and the medium to be scanned 9 is shifted in a direction perpendicular to the optical axes of the lenses in a deflection and scanning plane. Thereby, a beam spot formed on the medium to be scanned 9 increases in diameter, and, as a result, thus-resulting image quality is degraded. Such a problem is pointed out in Japanese Patent No. 2550153 of the present applicant.

Figure 3:
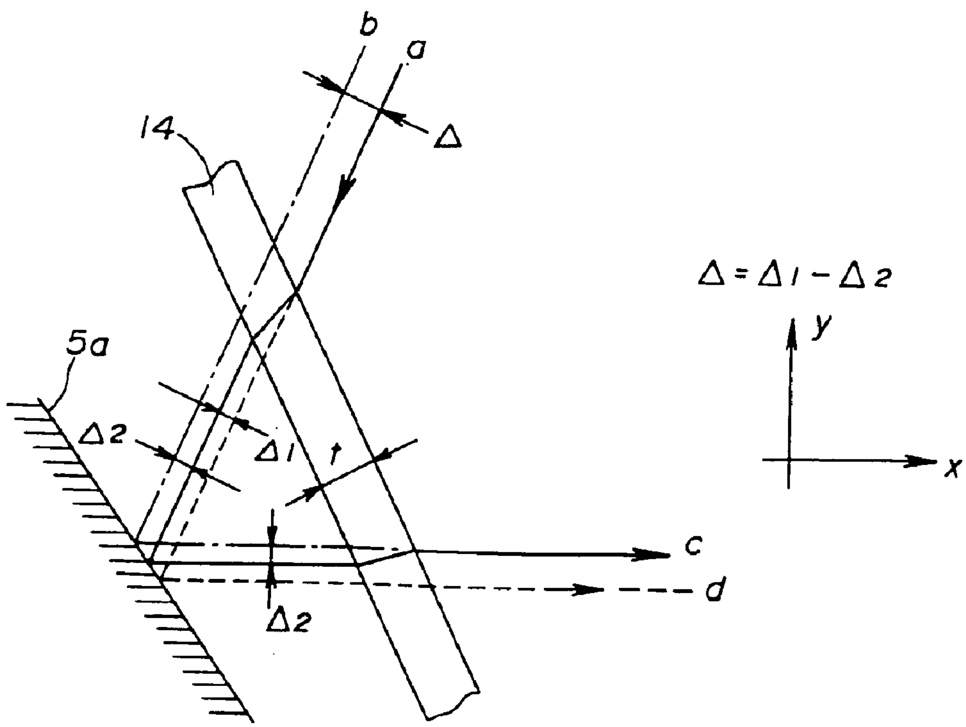
FIG. 3 shows light paths for illustrating an amount to shift a beam coming from a light-source part according to whether or not the transparent cover member is provided in each of the first, second and third embodiments of the first aspect of the present invention.

FIG. 3 illustrates the above-mentioned problem in detail. In FIG. 3, a beam of a light path 'a' is directed to the light deflector 5 from the light source. In the case where the cover member 14 is provided on the light path, the light path of the beam is such as that indicated by a solid line. On the other hand, in the case where the cover member 14 is not provided there, the light path of the beam is such as that indicated by a broken line. As shown in FIG. 3, in the case where the cover member 14 is provided, the beam is refracted by the cover member 14 while the beam is incident on the light deflector 5 and also while the beam reflected by the light deflector 5 exits therefrom, as indicated by a solid line 'c'. On the other hand, in the case where the cover member 14 is not provided, refraction of neither the incident beam nor the exiting beam occurs. As a result, the beam exits in a light path, as indicated a broken line 'd', different from the light path 'c' in the case where the cover member 14 is provided. This state is the above-mentioned state occurring as if the optical system between the light deflector 5 and the medium to be scanned 9 is shifted in the direction perpendicular to the axes of the lenses in the deflection and scanning plane, and, results in a shift of position of an imaging position due to rotation of curvature of image surface, and, thus, results in increase in diameter of a beam spot.

In order to solve this problem, the light path of the beam incident on the cover member 14 from the light source in the case where the cover member 14 is not provided is shifted in a direction perpendicular to the axis of the beam in the deflection plane so that the light path of the thus-shifted beam after reflected by the light deflector 5 coincides with the light path 'c' of the non-shifted beam after passing through the cover member 14, reflected by the light deflector 5 and again passing through the cover member 14. In FIG. 3, the amount of this shift is expressed by $\Delta$, and the light path of the shifted beam incident on the light deflector 5 is expressed by 'b'. Thus, by shifting the light path of the beam in the case where the cover member 14 is not provided in the direction perpendicular to the optical axis of the light source, the light path of the beam exiting from the light deflector 5 is made coincidence between the case where the cover member 14 is provided and the case where the cover member 14 is not provided. Accordingly, it is possible to prevent the imaging position from being shifted between the case where the cover member 14 is provided and the case where the cover member 14 is not provided. Thereby, it is possible to obtain a high-quality image.

In order to shift the light path of the beam coming from the light source toward the light deflector 5 between the case where the cover member 14 is provided and the case where the cover member 14 is not provided, a plurality of locations for holding and fixing a light-source part having the light source 1 and coupling lens 2 are provided in the above-mentioned optical housing corresponding to the case where the cover member 14 is provided and the case where the cover member 14 is not provided, respectively, and, an appropriate one of these locations is used case by case. A specific example thereof will now be described.

Figure 4:
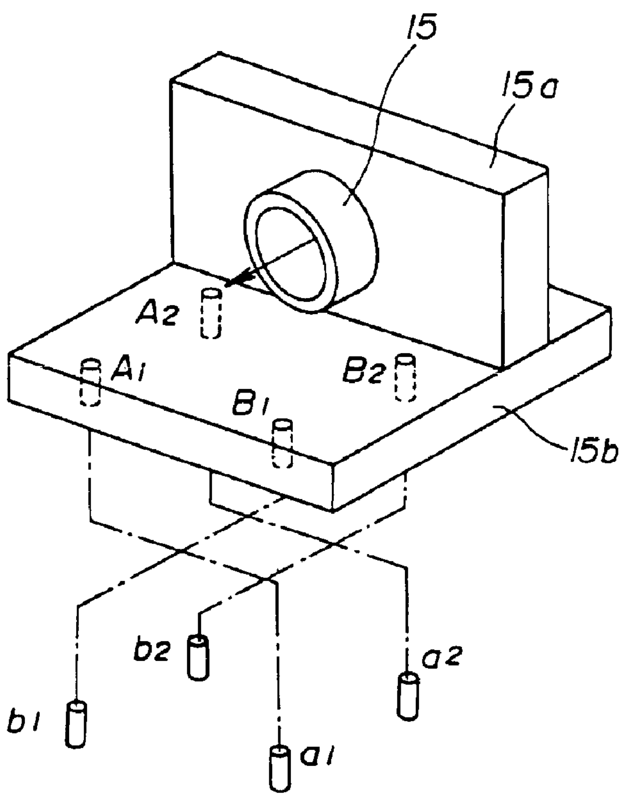
FIG. 4 shows a perspective view of the light-source part in the first embodiment of the first aspect of the present invention.

FIG. 4 illustrates this example. In FIG. 4, the light-source part 15 acts as a holding member holding the light source 1 and coupling lens 2. The light-source part 15 includes a plate-shaped vertical member **15*a* holding the light source 1 and coupling lens 2, and a plate-shaped horizontal member 15*b* on which the bottom surface of the vertical member 15*a* is fixed. The horizontal member 15*b* has four holes A1, A2, B1 and B2 each extending vertically at positions near the respective corners of a rectangle. On the other hand, in the above-mentioned optical housing in which the light-source part 15 is fixed, pins a1 and a2 corresponding to the respective holes A1 and A2, and pins b1 and b2 corresponding to the respective holes B1 and B2** are provided.

The pair of pins a1 and a2 and the pair of pins b1 and b2 are used as holding and fixing locations for holding and fixing the light-source part 15, respectively. Assuming that the pair of pins a1 and a2 are the holding and fixing locations for the case where the above-mentioned cover member 14 is not provided, the other pair of pins b1 and b2 are the holding and fixing location for the case where the cover member 14 is provided. The pair of pins a1 and a2 and the other pair of pins b1 and b2 are configured so that they do not interfere with one another so that, when one pair thereof are fitted in the corresponding holes so as to fix the light-source part 15 to the optical housing, the other pair do not interfere with it. For this purpose, for example, the positions thereof are determined to be away from each other appropriately, or, a recess or the like is provided for accommodating the other pins. Thus, by providing the plurality of holding and fixing locations for the light-source part 15, corresponding to the case where the cover member 14 is provided and the case where the cover member 14 is not provided, respectively, it is possible to prevent shift in imaging position from occurring by appropriately changing the position of the light-source part 15.

In the configuration shown in FIG. 4, the pair of pins a1 and a2 and the other pair of pins b1 and b2 have been described as the holding and fixing locations for the light-source part 15. However, it is also possible that the pair of holes Al and A2 and the other pair of holes B1 and B2 of the light-source part 15 are holding and fixing locations, instead. When the pair of pins a1 and a2 and the other pair of pins b1 and b2 have been determined as the holding and fixing locations, the following configuration is possible: That is, only one pair of holes are provided in the light-source part 15, and, either the pair of pins a1 and a2 or the pair of pins b1 and b2 are selectively fitted in this pair of holes of the light-source part 15. To the contrary, when the pair of holes A1 and A2 and the other pair of holes B 1 and B2 are used as the holding and fixing datums, the following configuration is possible: That is, only one pair of pins are in the optical hosing, and, either the pair of holes A1 and A2 or the pair of holes B1 and B2 selectively have this pair of pins fitted therein. Thus, the position of the light-source part 15 can be changed. Further, it is also possible that pins are provided on the light-source part 15, and holes, in which the pins are fitted, respectively, are provided in the optical housing, instead. An essential point is that a plurality of holding and fixing location are provided in at least one of the light-source part 15 and optical housing.

Figure 5:
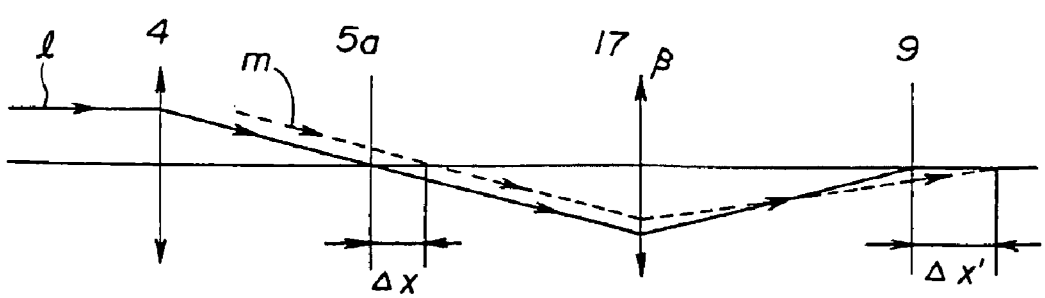
FIG. 5 shows light paths for illustrating a shift of imaging position along sub-scanning directions between cases where the transparent cover member is provided or not in each of the first, second and third embodiments of the first aspect of the present invention.

With reference to FIG. 5, shift of imaging position in a sub-scanning directional section between the case where the cover member 14 is provided and the case where the same is not provided will now be illustrated. In FIG. 5, a state indicated by a solid line 1 is a state in which the cover member 14 is not provided. In this state, a beam from the light-source part is used for imaging a line image long along the main scanning directions on or in the vicinity of the deflection reflective surface 5*a* through the line-image imaging system 4, and, then, is used for imaging a beam spot on the medium to be scanned 9 through the scanning and imaging system 17 which is a combination of the imaging lens 6 and long-dimensional lens 7. In FIG. 5, a state indicated by a broken line m is a state in which the cover member 14 is used. In this state, the beam having passed through the line-image imaging system 4 is shifted by the refracting function (floating) of the cover member 14, and, thereby, the line image on or in the vicinity of the deflection reflective surface 5*a* is shifted toward the medium to be scanned 9 by a distance Δx. Then, by an imaging lateral magnification β of the scanning and imaging system 17 along the sub-scanning directions, the imaging position of the beam is shifted by a distance Δx' at the medium to be scanned 9. There, $$\Delta x' = \Delta x \cdot \beta$$

Thus, in the sub-scanning directional section, in the case where the cover member 14 is used, in comparison to the case where the cover member 14 is not used, the imaging position is shifted by the distance Δx' along the directions of optical axis at the medium to be scanned 9. In order to eliminate this shift of the imaging position, it is necessary to move the line-image imaging system by the distance Δx along the directions of the optical axis. At this time, by providing a configuration such that the light-source part can hold the line-image imaging optical system 4, it is possible to easily deal with the case where the cover member 14 is used and the case where the cover member 14 is not used, by shifting the light-source part and line-image imaging optical system 4 integrally along the directions of the optical axis. In this case, the line-image imaging system 4 is positioned at a location position such that the position of the line-image imaging system 4 is optimum with respect to the light-source part.

Figure 6:
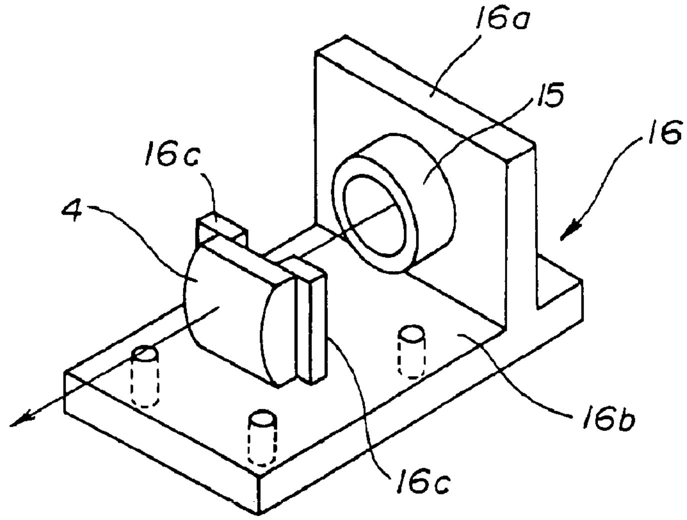
FIG. 6 shows a perspective view of the light-source part and line-image imaging optical system in the second embodiment of the first aspect of the present invention.

FIG. 6 shows a specific example of a configuration such that the line-image imaging system 4 is positioned at a location position such that the position of the line-image imaging system 4 is optimum with respect to the light-source part. As shown in FIG. 6, the configuration includes a holding member 16 including a plate-shaped vertical part 16*a* and a plate-shaped horizontal part 16*b* integral with the vertical part 16*a*. The light-source part 15 is mounted on the vertical part 16*a*. Location supporting parts 16*c* each having a shape of a quadratic prism are integrally provided on the horizontal part 16*b*. Surfaces of the location supporting parts 16*c* face a surface of the line-image imaging system 4 at both ends thereof. Further, the line-image imaging system 4 is fixed to the location supporting parts 16*c* as a result of being pressed thereto by a leaf spring or the like, not shown in the figure. Thus, the line-image imaging system 4 is disposed on the holding member 16 onto which the light-source part 15 is also disposed. Thereby, the line-image imaging system 4 is positioned along the directions of the optical axis optimally with respect to the light-source part 15. It is also possible that the line-image imaging system 4 is fixed to the location supporting parts 16*c* by adhesive.

Holes are formed in the horizontal part 16*b* of the holding member 16 such that the light-source part 15 and line-image imaging system 4 integral with the light-source part 15 are fixed at a predetermined datum position of the optical housing. For this purpose, these holes have pins formed in the optical housing fitted therein. The pins which are used to fit into the holes of the holding member 16 are selected, or the holes of the holding member 16 in which the specific pins of the optical housing are fitted are selected. Thereby, it is possible to change the position of the holding member 16 along the directions of the optical axis according to whether or not the above-mentioned cover member 14 is used.

In the example (second embodiment of the first aspect of the present invention) shown in FIG. 6, a distance between the holding member 16 and the light deflector 5 is set so that the position of the line-image imaging optical system 4 is optimum according to whether or not the cover member 14 is used. Accordingly, distances of the light source 1 and coupling lens 2 to the light-deflector 5 also change according to whether or not the cover member 14 is used. Thus, the deviation of the imaging position in the section parallel to the sub-scanning directions is corrected. However, the overall magnification is different between the sub-scanning directions and main scanning directions. Accordingly, when the imaging position along the sub-scanning directions is corrected, the imaging position along the main scanning directions is not corrected. Therefore, it is preferable that the beam emitted form the coupling lens 2 is an approximately parallel beam such that the beam is not affected by the position of the line-image imaging system 4. Thereby, the beam incident on the scanning and imaging system 17 is kept as an approximate parallel beam along the main scanning directions, and, as a result, the position of the line-image imaging system 4 does not affect the state of imaging by the scanning and imaging system 17.

When the beam from the coupling lens 2 is a divergent beam or a convergent beam, the distance between the natural beam condensed position and medium to be scanned 9 differs due to the position of the line-image imaging optical system 4. Accordingly, the state of imaging by the scanning and imaging system 17 is affected thereby, the imaging state is degraded, and image quality is degraded due to increase in the beam diameter and so forth.

As a method of increasing the speed of optical writing and thus image formation, there is a method in which the light-source part includes a plurality of light sources, and, thus, is of a multi-beam type, and, also, the rotation speed of the light deflector is increased. Thereby, it is possible to increase the mechanical output speed effectively.

In order to deal with both the case where image formation is made to be of high speed through employment of the multi-beam light-source part and increase in the rotational speed of the light deflector, and the case where image formation is made to be of low speed, the following arrangement is made, for example: That is, when a low-speed output machine is configured, the light-source part includes a single light source, the light deflector is rotated so slowly that substantial zipping noise does not occur, and the above-mentioned cover member 14 is omitted. When the high-speed output machine is configured, multi-beam scanning is rendered through a plurality of light sources, the light deflector is rotated at high speed, and the above-mentioned transparent cover member 14 is used as a measure against zipping noise occurring due to the high-speed rotation of the light deflector. Also, a semiconductor laser array having a plurality of light-emitting points enclosed in one package is used as the light source in the case of high-speed output machine is configured. In such a case, the holding member holding the semiconductor laser array can also be used in common in a case where the light source has a single light emitting point.

On the other hand, in view of compactness of the machine, there is a method in which the coupling lens 2 and line-image imaging optical system 4 are integrated (into a single lens), and the holding member 16 shown ion FIG. 6 is miniaturized. Also in this case, it is preferable that the beam emitted from the thus-integrated coupling lens 2 is an approximately parallel beam, as mentioned above.

With reference to FIG. 3, a specific method of contriving a specific amount to shift the light-source part 15 and holding member 16 will now be described. In FIG. 3, when the cover member 14 is used, the light path of the beam 'a' from the light-source part 15 is shifted by a distance Δ1 by the transparent cover member 14. The beam is then reflected by the deflection reflective surface 5*a*, and, then, the light path of the beam is again shifted by a distance Δ2 by the transparent cover member 14. The total thereof, that is, $$\Delta=\Delta 1+\Delta 2$$

is the amount to shift the light-source part 15 in a direction perpendicular to the optical axis of the light-source part 15. In FIG. 3, it is assumed that directions parallel to the optical axis of the scanning and imaging system is an x-axis, and directions perpendicular thereto is a y-axis. Further, it is assumed that the beam 'c' emitted from the cover member 14 goes along a direction parallel to the x-axis.

Figure 7:
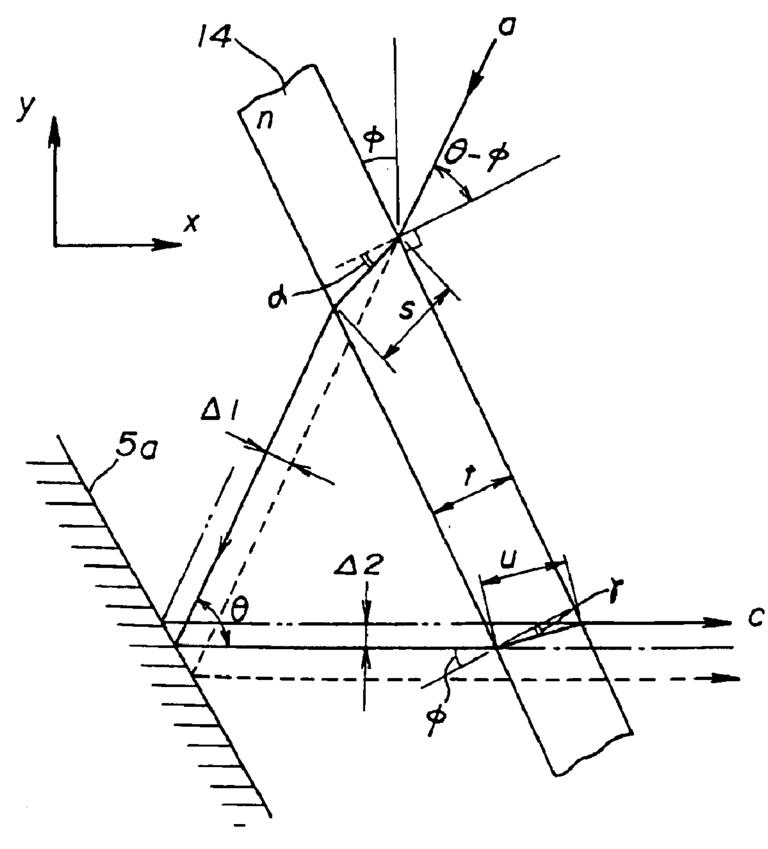
FIG. 7 shows in more detail the light paths for illustrating the above-mentioned amount to shift the beam coming from the light-source part.

FIG. 7 shows FIG. 3 in more detail. In FIG. 7, $\phi$ denotes an angle of the cover member 14 with respect to the y-axis;

$\theta$ denotes an angle between the beam incident on the deflection reflective surface 5*a* and the beam reflected thereby;

$\theta-\phi$ denotes an angle between the normal of the cover member 14 and the incident beam 'a';

$\alpha$ denotes an angle between the beam refracted by the cover member 14 and the normal thereof;

n denotes a refractive index of the cover member 14;

S denotes a length of light path of the beam passing through the cover member 14; and t denotes a thickness of the cover member 14.

Then, $$n\cdot\sin\alpha=\sin(\theta-\phi)$$

$$S\cdot\sin\alpha=t$$

$$\begin{aligned}\Delta 1&=S\cdot\sin(\theta-\phi-\alpha)\\&=(t/\cos\alpha)\cdot\sin(\theta-\phi-\alpha)\end{aligned}$$

Similarly, with regard to the beam reflected by the deflection reflective surface 5*a*, $\gamma$ denotes an angle between the beam refracted by the cover member 14 and the normal thereof; and u denotes a length of light path of the beam passing through the cover member 14.

Then, $$n\cdot\sin\gamma=\sin\phi$$

$$u\cdot\cos\gamma=t$$

$$\begin{aligned}\Delta 2&=u\cdot\sin(\phi-\gamma)\\&=(t/\cos\gamma)\cdot\sin(\phi-\gamma)\end{aligned}$$

Accordingly, $$\begin{aligned}\Delta&=\Delta 1+\Delta 2\\&=t\cdot\{(1/\cos\alpha)\cdot\sin(\theta-\phi-\alpha)+\\&\quad(1/\cos\gamma)\cdot\sin(\phi-\gamma)\}\end{aligned}$$

Figure 8:
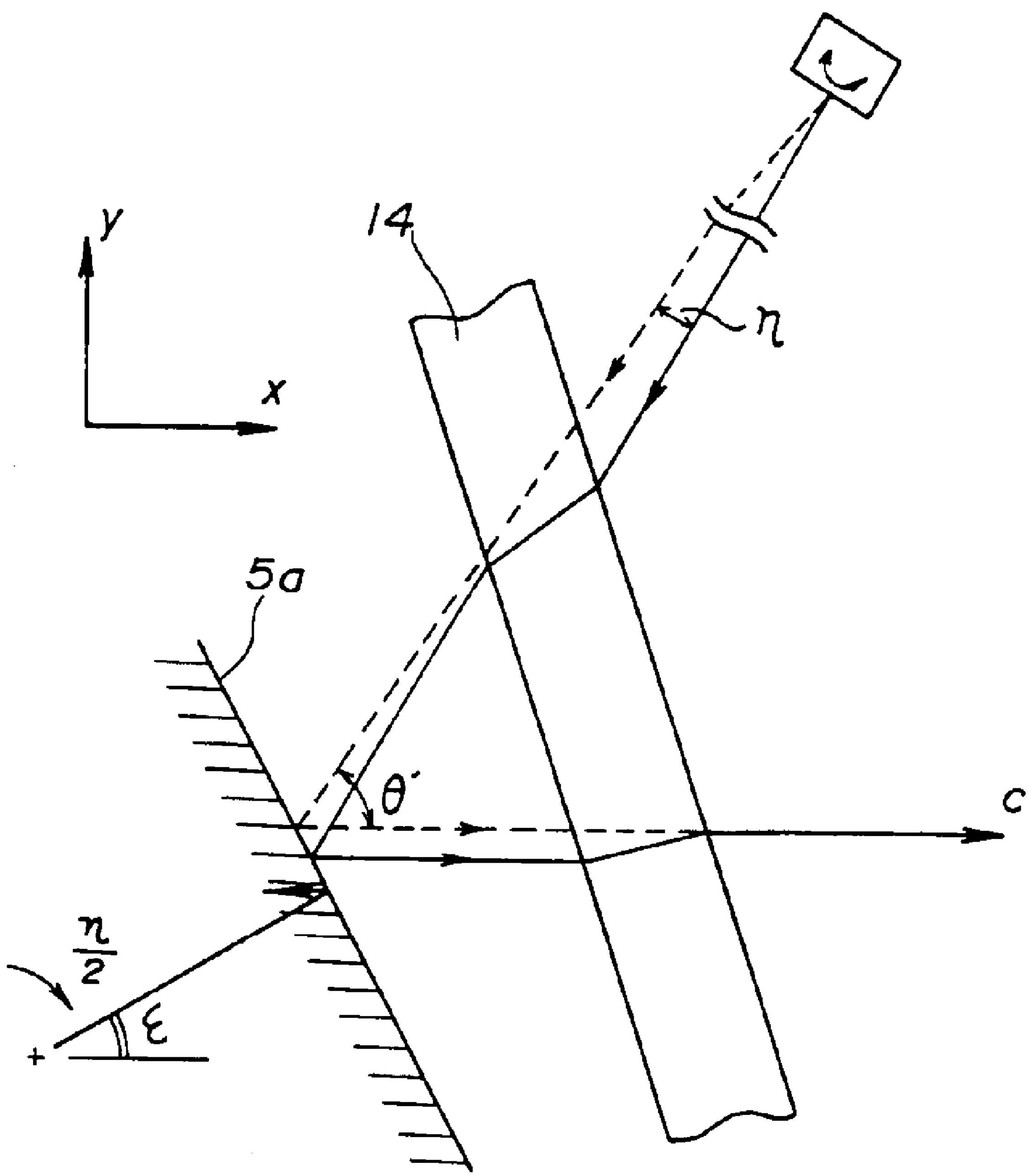
FIG. 8 illustrates the third embodiment of the first aspect of the present invention in which an incident angle of the beam coming from the light-source part is changed according to whether or not the transparent cover member is used.

In the above-described example, by shifting the optical axis of the light-source part, whether or not the transparent cover member having the soundproof and dustproof functions is used is dealt with. However, as an another method, it is possible to deal therewith by changing the angle of the beam coming from the light-source part toward the light deflector 5, as shown in FIG. 8. In FIG. 8, the beam from the light-source part toward the light deflector 5 is inclined by an angle $\eta$ when the cover member 14 is not used, in comparison to the case where the cover member 14 is used.

Actually, the angle θ' between the beam incident on the deflection reflective surface 5*a* of the light deflector 5 and the beam reflected thereby is smaller by the angle $\eta$ than the angle $\theta$ between the beam incident on the deflection reflective surface 5*a* of the light deflector 5 and the beam reflected thereby in the case where the cover member 14 is used. That is, $$\theta'=\theta-\eta$$

Accordingly, in order to cause the beam to be reflected 2 in the direction 'c' parallel to the x-axis, an angle $\epsilon$ between the normal of the deflection reflective surface 5*a* and the x-axis when the cover member is not used should be such that $$\epsilon'=\epsilon-(\eta/2)$$

where $\epsilon$ denotes an angle between the normal of the deflection reflective surface 5*a* and the x-axis in the case where the cover member 14 is used.

Thus, it is possible to deal with whether or not the cover member 14 is used, by changing the direction in which the beam is emitted from the light-source part without translating the light-source part.

Further, the influence by the so-called floating due to the cover member 14 is the same between the case where the light-source part is translated and the case where the direction of the beam emitted from the light-source part is changed, according to whether or not the cover member 14 is used. Accordingly, it is possible that various design requirements such as the position of the line-image imaging optical system 4, parallelity of the beam emitted from the light-source part and so forth are the same as those in the case where the light-source part is translated. Further, a plurality of holding and fixing locations of the light-source part are provided so as to deal with the case where the cover member 14 is used and the case where the cover member 14 is not used, for the purpose of appropriately changing the direction of the beam incident on the light deflector 5 as mentioned above.

Further, it is also possible that the line-image imaging optical system is separate from the light-source part, and, the position of the line-image imaging optical system along the directions of the optical axis thereof is shifted, thereby whether or not the cover member 14 is used is dealt with. In this case, the beam emitted from the coupling lens does not need to be an approximately parallel beam, and, may be a convergent beam or a convergent beam. In such a case, the position of the light-source part along the directions of the optical axis thereof should be changed so as to correct the influence of the so-called floating occurring due to disposition of the cover member.

Figure 9:
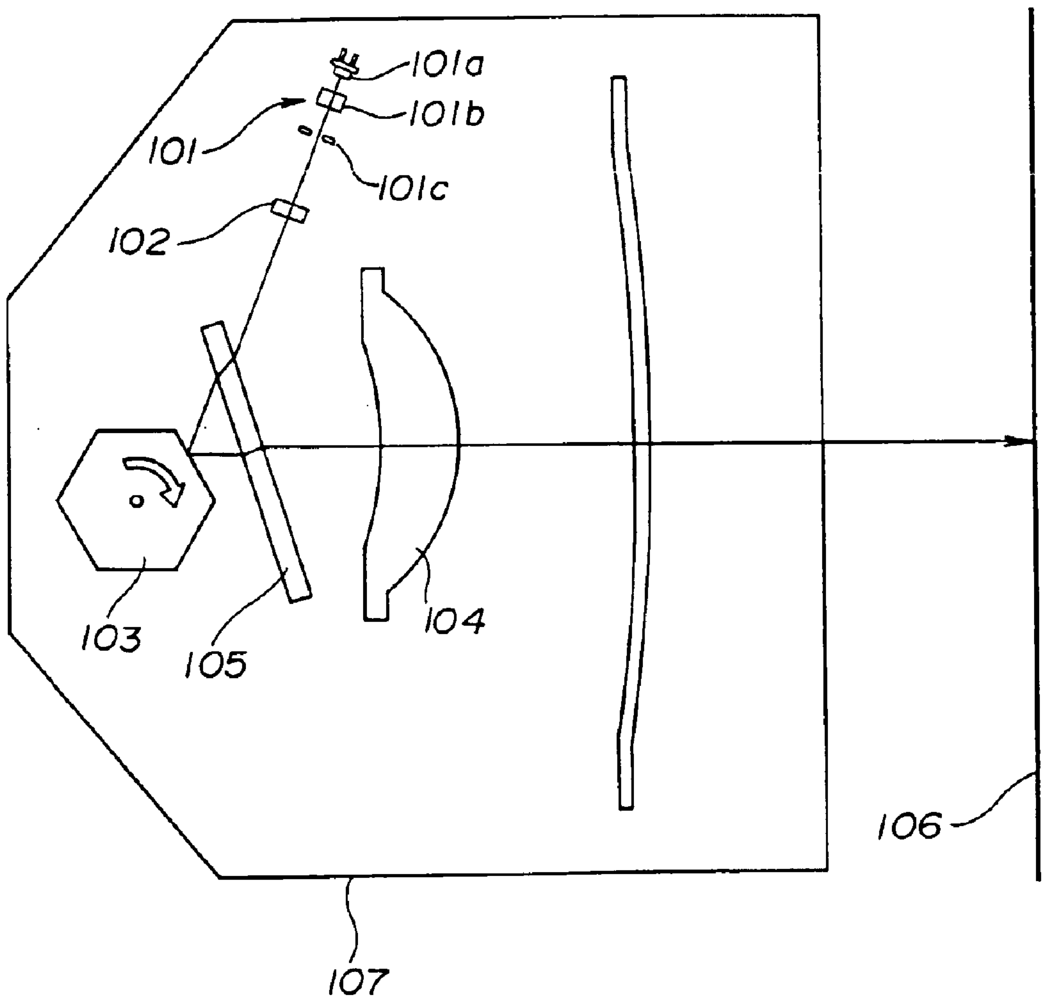
FIG. 9 shows a general plan view of an optical scanning device in each of first, second and third embodiments of a second aspect of the present invention.

FIG. 9 is a general plan view showing an optical scanning device in a first embodiment of a second aspect of the present invention. As shown in FIG. 9, the optical scanning device includes a light-source unit 101, a first imaging optical system 102, a deflector (polygon mirror) 103, a second imaging optical system 104 and a transparent member 105 of an approximately parallel plate.

The light-source unit 101 emits a beam. The first imaging optical system 102 causes the beam emitted from the light-source unit 101 to image at a predetermined position. The deflector 103 is rotated in a predetermined direction at a fixed velocity, and, also, receives the beam from the first imaging optical system 102 and scans a surface to be scanned 106 thereby.

The light-source unit 101 includes a light source 101*a* emitting the beam, a coupling lens 101*b* condensing the beam emitted by the light source 101*a* and an aperture 101*c* reducing the beam from the coupling lens 101*b* in diameter. The transparent member 105 is disposed detachably between the first imaging optical system 102 and deflector 103 and between the deflector 103 and second imaging optical system 104. The transparent member 105 is used for the purpose of soundproof and dustproof. The light-source unit 101, first imaging optical system 102, deflector 103, second imaging optical system 104 and transparent member 105 are mounted in a box housing 107.

Figure 10:
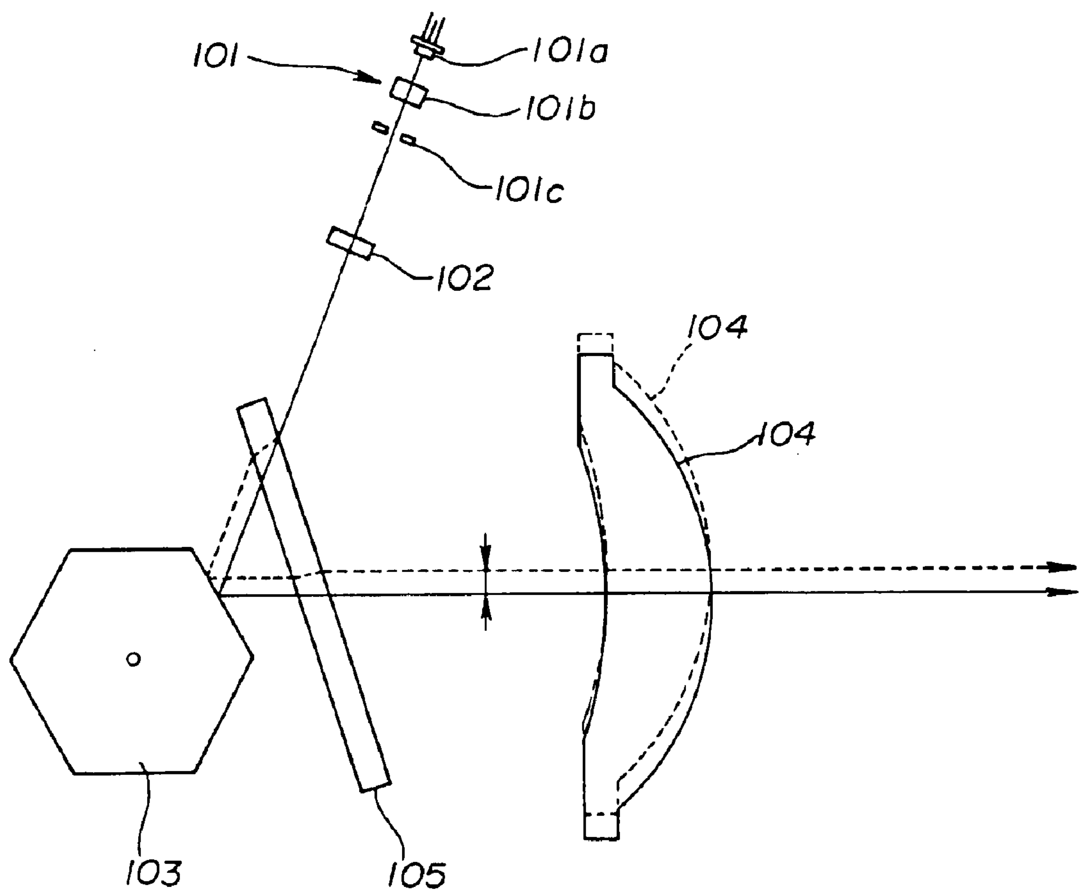
FIG. 10 illustrates a difference in light path of a beam between a case where an optical scanning device has a transparent member and a case where the optical scanning device does not have the transparent member.

FIG. 10 shows a difference in light path of the beam between a case where the optical scanning device has the transparent member 105 and the case where the optical scanning device does not have the transparent member 105. In FIG. 10, a broken line represents the axis of the beam in the case where the optical scanning device has the transparent member 105, while a solid line represents the axis of the beam in the case where the optical scanning device does not have the transparent member 105. As shown in FIG. 10, it is clear that a deviation of axis of the beam (optical-axis deviation) occurs due to whether or not the transparent member 105 is used.

Figure 11:
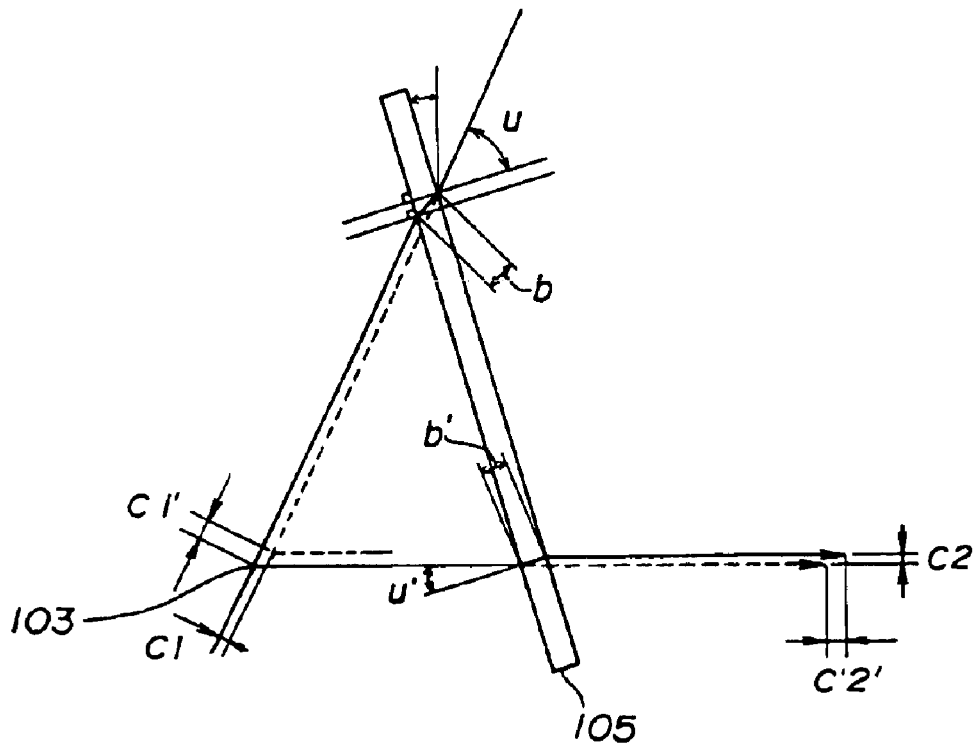
FIG. 11 shows a floating amount (C1', C2') of an optical image along directions of the axis of the beam and a deviation amount (C1, C2) of the axis of the beam in the case where the transparent member is used in the optical scanning device.

FIG. 11 shows a floating amount (C1', C2') of an optical image along directions of the axis of the beam and a deviation amount (C1, C2) of the axis of the beam in the case where the transparent member 105 is used in the optical scanning device. As shown in FIG. 11, assuming that b denotes a length of light path in the transparent member 105 of the beam coming from the first imaging optical system 102 and u denotes an incident angle onto the transparent member 105, the floating amount C1' of the optical image along the directions of the axis of the beam and the deviation amount C1 of the axis of the beam are expressed as follows:

$$C1' = b \cos u$$

$$C1 = b \sin u$$

Further, assuming that b' denotes a length of light path in the transparent member 105 of the beam coming from the deflector 103 and u' denotes an incident angle onto the transparent member 105, the floating amount C2' of the optical image along the directions of the axis of the beam and the deviation amount C2 of the axis of the beam are expressed as follows:

$$C2' = b \cos u'$$

$$C2 = b' \sin u'$$

The optical scanning device in the first embodiment of the second aspect of the present invention prevents these deviations of the axis of the beam.

Figure 12A:
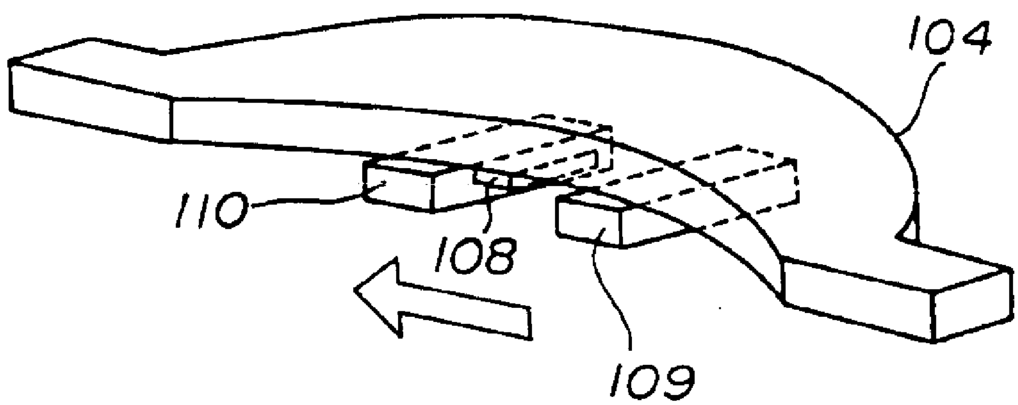
FIGS. 12A and 12B show an essential part of the optical scanning device in the first embodiment of the second aspect of the present invention.
Figure 12B:
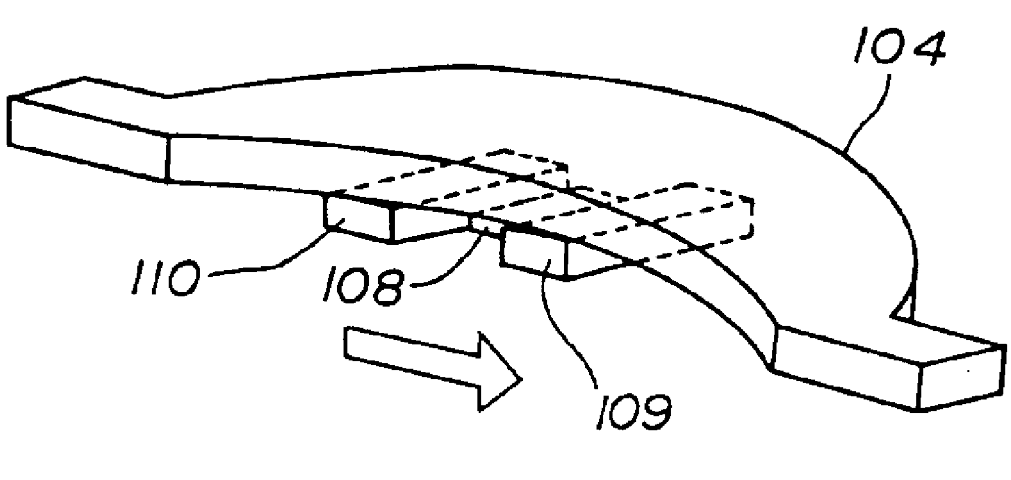

FIGS. 12A and 12B show an essential part of the above-mentioned optical scanning device in the first embodiment of the second aspect of the present invention. As shown in FIGS. 12A and 12B, the second imaging optical system 104 has a projection 108 for positioning the system 104 along main scanning directions (directions perpendicular to the optical axis of the second scanning and imaging optical system 104). In the box housing 107, two receiving parts 109 and 110 are formed with a predetermined interval therebetween along the directions perpendicular to the optical axis of the second scanning and imaging optical system 104. The projection 108 of the second scanning and imaging optical system 104 is disposed between these two receiving parts 109 and 110.

By causing the projection 108 of the second scanning and imaging optical system 104 to come into contact with either one of the two receiving parts 109 and 110, the positioning of the second scanning and imaging optical system 104 along the main scanning directions is performed. That is, when the optical scanning device does not employ the transparent member 105, the axis of the beam is as indicated by the solid line shown in FIG. 10. Therefore, as shown in FIG. 12B, the positioning of the second scanning and imaging optical system 104 is performed in a condition in which the projection 108 is in contact with the receiving part 109. Thereby, the second scanning and imaging optical system 104 is disposed as indicated by a solid line shown in FIG. 10. However, when the optical scanning device employs the transparent member 105, the axis of the beam is as indicated by the broken line shown in FIG. 10. Therefore, as shown in FIG. 12A, the positioning of the second scanning and imaging optical system 104 is performed in a condition in which the projection 108 is in contact with the receiving part 110. Thereby, the second scanning and imaging optical system 104 is disposed as indicated by a broken line shown in FIG. 10. Thus, the amount of deviation in beam axis occurring due to whether or not the transparent member 105 is employed in the optical scanning device is canceled as a result of the second scanning and imaging optical system 104 being positioned as a result of the projection 108 thereof being caused to be in contact with a respective one of the two receiving parts 109 and 110.

Figure 13A:
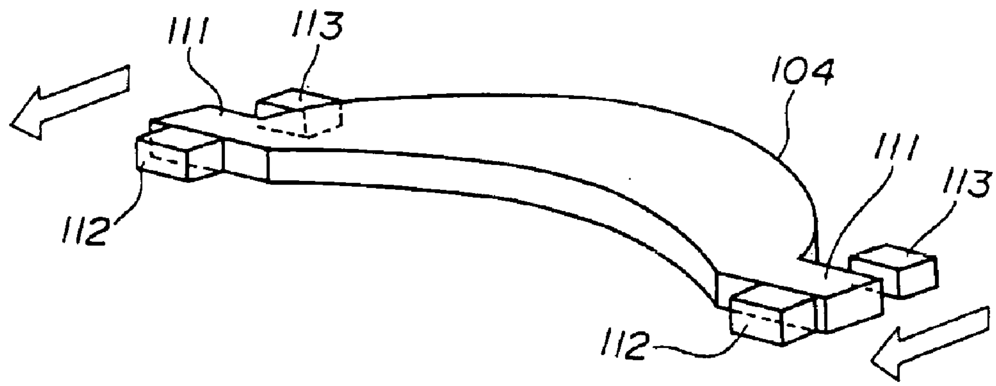
FIGS. 13A and 13B show an essential part of the optical scanning device in the second embodiment of the second aspect of the present invention.
Figure 13B:
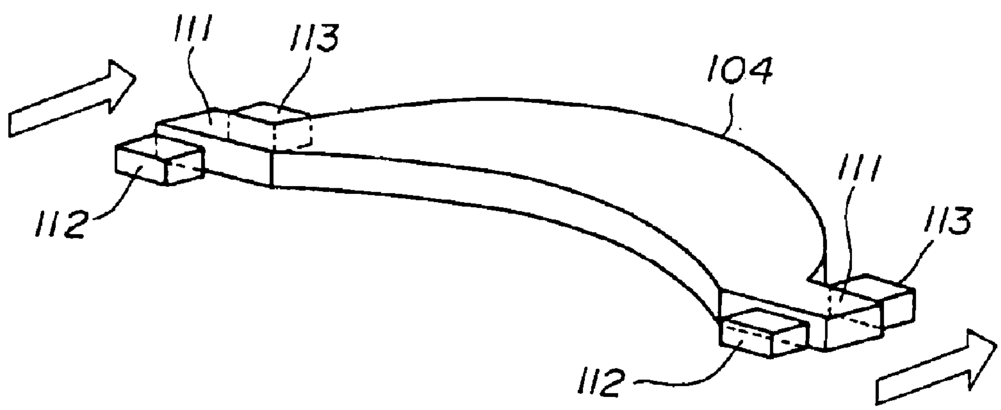

With reference to FIGS. 9, 13A and 13B, a second embodiment of the second aspect of the present invention will now be described. FIGS. 13A and 13B show an essential part of the optical scanning device in the second embodiment of the second aspect of the present invention. In FIGS. 13A and 13B, the same reference numerals are given to parts/components the same as those of the first embodiment of the second aspect of the present invention shown in FIGS. 12A and 12B. As shown in FIGS. 13A and 13B, the second imaging optical system 104 has ribs 111 at both ends thereof. The ribs 111 are used for positioning the second scanning and imaging optical system 104 along the directions of the optical axis of the optical system 104. In the box housing 107, two pairs of rib-receiving parts 112 and 113 are formed with a predetermined interval therebetween along the directions of the optical axis of the second scanning and imaging optical system 104. Each rib 111 of the second scanning and imaging optical system 104 is disposed between a respective pair of the two pairs of rib-receiving parts 112 and 113.

By causing each rib 111 of the second scanning and imaging optical system 104 to come into contact with either one of a respective pair of the two pairs of rib-receiving parts 112 and 113, the positioning of the second scanning and imaging optical system 104 is performed. That is, when the optical scanning device does not employ the transparent member 105, the axis of the beam is as indicated by the broken line shown in FIG. 11. Therefore, as shown in FIG. 13B, the positioning of the second scanning and imaging optical system 104 is performed in a condition in which each rib 111 is in contact with the rib-receiving part 113 of the respective pair. However, when the optical scanning device employs the transparent member 105, the axis of the beam is as indicated by the solid line shown in FIG. 11. Therefore, as shown in FIG. 13A, the positioning of the second scanning and imaging optical system 104 is performed in a condition in which each rib 111 is in contact with the rib-receiving part 112 of the respective pair. Thus, the amount of floating of optical image along the directions of beam axis occurring due to whether or not the transparent member 105 is employed in the optical scanning device is canceled as a result of the second scanning and imaging optical system 104 being positioned as a result of each rib 111 thereof being caused to be in contact with an appropriate one of the rib-receiving parts 112 and 113 of the respective pair.

Figure 14A:
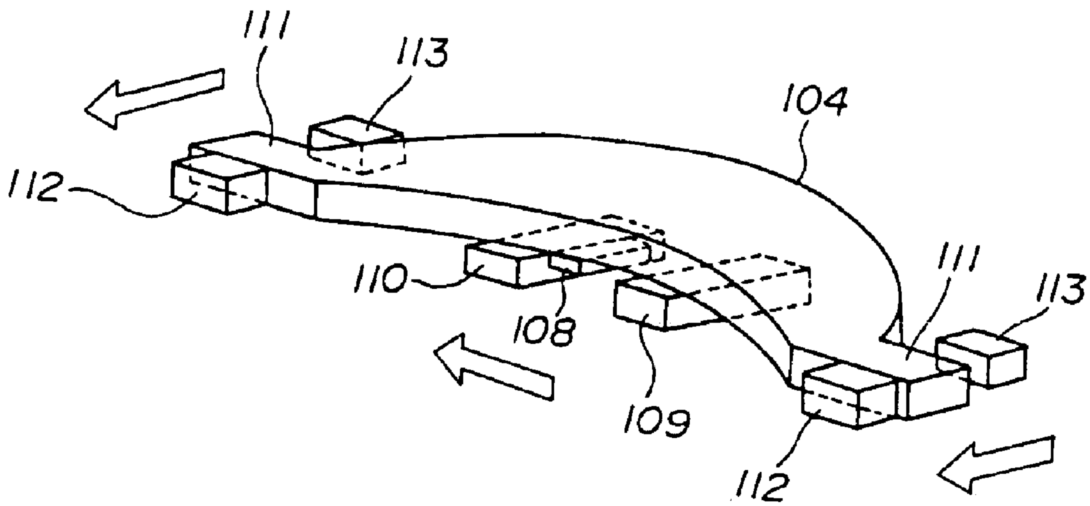
FIGS. 14A and 14B show an essential part of the optical scanning device in the third embodiment of the second aspect of the present invention.
Figure 14B:
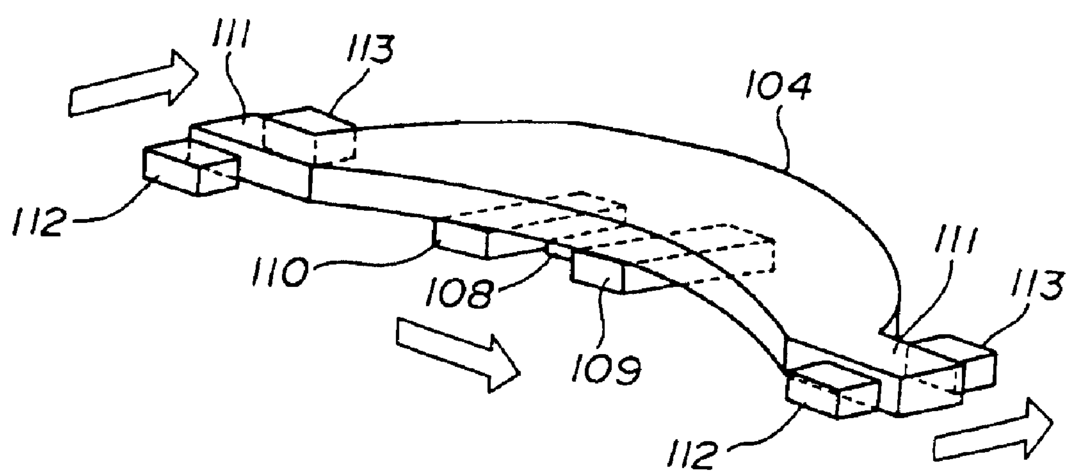

FIGS. 14A and 14B show an essential part of an optical scanning device in a third embodiment of the second aspect of the present invention. In FIGS. 14A and 14B, the same reference numerals are given to parts/components the same as those of the first embodiment of the second aspect of the present invention shown in FIGS. 12A and 12B and second embodiment of the second aspect of the present invention shown in FIGS. 13A and 13B.

The third embodiment of the second aspect of the present invention is a combination of the above-described first and second embodiments of the second aspect of the present invention. As shown in FIGS. 14A and 14B, the second imaging optical system 104 has a projection 108 for positioning the optical system 104 along the main scanning directions (directions perpendicular to the optical axis of the second scanning and imaging optical system 104). In the box housing 107, two receiving parts 109 and 110 are formed with a predetermined interval therebetween along the directions perpendicular to the optical axis of the second scanning and imaging optical system 104. The projection 108 of the second scanning and imaging optical system 104 is disposed between these two receiving parts 109 and 110. Positioning of the second imaging optical system 104 along the main scanning directions is performed as a result of the projection 108 thereof being caused to come into contact with either one of the two receiving parts 109 and 110.

The amount of deviation of beam axis along the main scanning directions occurring due to whether or not the transparent member 105 is employed in the optical scanning device is canceled as a result of the second scanning and imaging optical system 104 being positioned as a result of the projection 108 thereof being caused to be in contact with a respective one of the two receiving parts 109 and 110.

Further, the second imaging optical system 104 has ribs 111 at both ends thereof. The ribs 111 are used for positioning the second scanning and imaging optical system 104 along the directions of the optical axis of the optical system 104. In the box housing 107, two pairs of rib-receiving parts 112 and 113 are formed with a predetermined interval therebetween along the directions of the optical axis of the second scanning and imaging optical system 104. Each rib 111 of the second scanning and imaging optical system 104 is disposed between a respective pair of the two pairs of rib-receiving parts 112 and 113.

The amount of floating of optical image along the directions of beam axis occurring due to whether or not the transparent member 105 is employed in the optical scanning device is canceled as a result of the second scanning and imaging optical system 104 being positioned along the directions of the optical axis thereof as a result of each rib 111 thereof being caused to be in contact with an appropriate one of the rib-receiving parts 112 and 113 of the respective pair.

Figure 15:
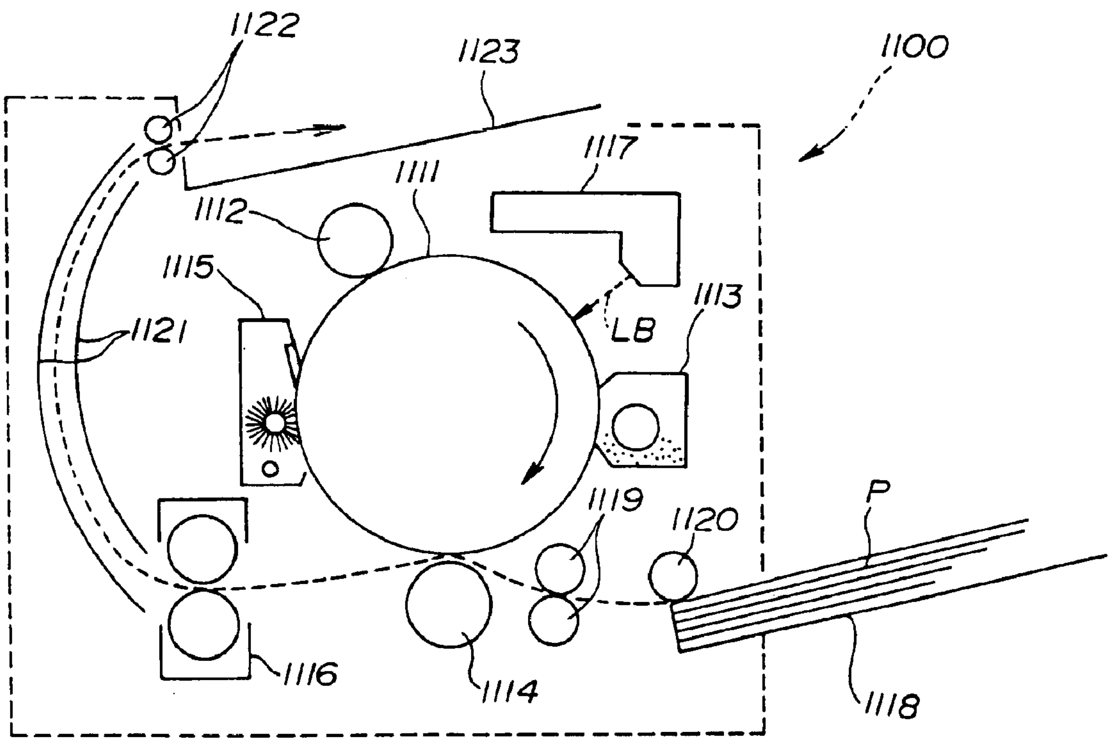
FIG. 15 shows a general elevational sectional view of an image forming apparatus in one embodiment of the present invention.

With reference to FIG. 15, an image forming apparatus in one embodiment of the present invention will now be described.

The image forming apparatus shown in FIG. 15 is a laser printer, for example.

This laser printer 1100 has a cylindrical photoconductive photosensitive body acting as a photosensitive medium 1111. In the periphery of the photosensitive medium 1111, a charging roller 1112 acting as a charging unit, a developing device 1113, a transfer roller 1114, and a cleaning device 1115 are disposed. It is also possible to use a well-known corona charger as the charging unit.

Further, an optical scanning device 1117 using a laser beam LB is provided, and performs exposure through optical writing between the charging roller 1112 and developing device 1113.

As shown in FIG. 15, a fixing device 1116, a cassette 1118, a pair of registration rollers 1119, a paper feeding roller 1120, a conveying path 1121, a pair of paper ejecting rollers 1122, and a tray 1123 are also provided. Transfer paper P is used as a sheet-type recording medium.

When image formation is performed, the photosensitive medium 1111 is rotated clockwise at a uniform velocity, the surface thereof is charged uniformly by the charging roller 1112, and an electrostatic latent image is formed on the surface (surface to be scanned) of the photosensitive medium 1111 through exposure by optical writing with the laser beam LB of the optical scanning device 1117. The thus-formed electrostatic latent image is a so-called negative latent image having an image part exposed thereby.

This electrostatic latent image is developed inversely by the developing device 1113, and, thus, a toner image is formed on the photosensitive medium 1111.

The cassette 1118 containing the transfer paper P is detachable from/to the body of the image forming apparatus 1100. In the state in which the cassette 1118 is loaded as shown in the figure, the top one sheet of the transfer paper P is fed by the paper feeding roller 1120. The thus-fed transfer paper P is nipped by the pair of registration rollers 1119 at the top of the paper P. The pair of registration rollers 1119 feed the transfer paper P to a transfer position of the photosensitive medium 1111 at the time at which the toner image is moved to the transfer position. The fed transfer paper P is laid onto the toner image at the transfer position, and, by the function of the transfer roller 1114, the toner image is transferred to the transfer paper P electrostatically.

The transfer paper P thus having had the toner image transferred thereto is sent to the fixing device 1116, which fixes the toner image onto the transfer paper P. Then, the transfer paper P passes through the conveying path 1121, and is ejected to the tray 1123 by the pair of ejecting rollers 1122. The surface of the photosensitive medium 1111 is then cleaned by the cleaning device 1115, and, thus, remaining toner, paper powder and so forth are removed therefrom.

It is also possible to use an OHP sheet instead of the above-mentioned transfer paper. A provision may be made such that the transfer of the toner image is performed via an intermediate transfer medium such as an intermediate transfer belt or the like. By employing the optical scanning device including the scanning and imaging lens such as that in any of the first, second and third embodiments of the first aspect of the present invention described above with reference to FIGS. 1 through 8, and, the first, second and third embodiments of the second aspect of the present invention described above with reference to FIGS. 9 through 14B, as the optical scanning device 1117 of the above-described image forming apparatus in the embodiment of the present invention shown in FIG. 15, it is possible to render satisfactory proper image formation.

The present invention is not limited to the above-described embodiments, and variations and modifications may be made without departing from the scope of the present invention.

The present application is based on Japanese priority applications Nos. 2000-180391 and 2000-111729, filed on Jun. 15, 2000 and Apr. 13, 2000, respectively, the entire contents of which are hereby incorporated by reference.

What is claimed is:

1. An optical scanning device comprising:

a light source;

a coupling lens coupling a beam emitted from said light source;

a light deflector deflecting the beam from said coupling lens at a uniform angular velocity;

a line-image imaging optical system disposed between said coupling lens and light deflector, and causing the beam to image a line image long along main scanning directions on or in the vicinity of a deflection reflective surface of said light deflector;

a scanning and imaging optical system causing the beam deflected by said light deflector to image a beam spot on a medium to be scanned; and an optical housing in which said light source, coupling lens, light deflector, line-image imaging optical system and scanning and imaging optical system are disposed, and contained, and wherein a plurality of holding and fixing locations for holding and fixing a light-source part comprising said light source and coupling lens are provided in at least one of said light-source part and optical housing, wherein said plurality of holding and fixing locations comprise pins and holes provided to the light source part and the optical housing, which pins and holes are combined with insertion of the pins to the holes to determine a relative spatial relationship between the light source part and the optical housing, and wherein said plurality of holding and fixing locations are those from which a selection is made as to where the light-source part is fixed, whereby a location of said light-source part is determined according to the selection, wherein the selection is made based on whether a glass cover is inserted between the coupling lens and the first deflector.

2. The device as claimed in claim 1, wherein:

said glass cover is inserted to cover said light deflector;

said cover has a window for the beam to be incident on and exit from said light deflector; and a transparent cover member is mountable on said window, and wherein said holding and fixing locations are determined so that, by selectably using said holding and fixing locations, the beam deflected by said light deflector passes through said scanning and imaging optical system approximately at a position that is the same whether or not said transparent cover member is mounted.

3. The device as claimed in claim 1, wherein said light-source part and line-image imaging optical system are disposed on a common member.

4. The device as claimed in claim 1, wherein said coupling lens and line-image imaging optical system are formed integrally.

5. The device as claimed in claim 1, wherein said light-source part comprises a plurality of light-emitting sources.

6. The device as claimed in claim 3, wherein the beam emitted from said light-source part comprises an approximately parallel beam.

7. The device as claimed in claim 4, wherein the beam emitted from said light-source part comprises an approximately parallel beam.

8. An optical scanning device comprising:

a light-source unit emitting a beam;

a first imaging optical system causing the beam emitted by said light-source unit to image at a predetermined position;

a deflector receiving the beam from said first imaging optical system and performing scanning with the beam; and a second imaging optical system causing the beam from said deflector to image a beam spot on a surface to be scanned, and wherein:

said light-source unit, first imaging optical system, deflector and second imaging optical system are mounted in a box housing;

a transparent member of an approximately parallel plate is disposed detachably so as to be located between said first imaging optical system and deflector and between said deflector and second imaging optical system;

a mounting position of said second imaging optical system is changeable according to whether or not said transparent member is provided; and wherein a change of the mounting position of said second imaging optical system according to whether or not the transparent member is used is achieved by a selection of the mounting position of said second imaging optical system from among a plurality of predetermined locations, and wherein said plurality of predetermined locations comprise projections and receiving members provided to the second imaging optical system and the box housing, which projections and receiving members are combined with contact therebetween to determine the mounting position of said second imaging optical system in the box housing.

9. The device as claimed in claim 8, wherein the mounting position of said second imaging optical system along main scanning directions is changeable according to whether or not said transparent member is used.

10. The device as claimed in claim 8, wherein the mounting position of said second imaging optical system along directions of an optical axis thereof is changeable according to whether or not said transparent member is used.

11. The device as claimed in claim 8, wherein the mounting position of said second imaging optical system along main scanning directions and directions of an optical axis thereof is changeable according to whether or not said transparent member is used.

12. An optical scanning device comprising:

light emitting means for emitting a beam;

coupling means for coupling the beam emitted by said light emitting means;

light deflecting means for deflecting an incident beam at a uniform angular velocity; line-image imaging means for causing the beam coupled by said coupling means to image a line image long along main scanning directions on or in the vicinity of a deflection reflective surface of said light deflecting means;

scanning and imaging means for causing the beam deflected by said light deflecting means to image a beam spot on a medium to be scanned; and an optical housing in which said light emitting means, coupling means, light deflecting means, line-image imaging means and scanning and imaging means are disposed, and contained, and wherein a plurality of holding and fixing locations for holding and fixing a light-source part comprising said light emitting means and coupling means are provided in at least one of said light-source part and optical housing, wherein said plurality of holding and fixing locations comprise pins and holes provided to the light source part and the optical housing, which pins and holes are combined with insertion of the pins to the holes to determine a relative spatial relationship between the light source part and the optical housing, and wherein said plurality of holding and fixing locations are those from which a selection is made as to where the light-source part is fixed, whereby a location of said light-source part is determined according to the selection, wherein the selection is made based on whether a glass cover is inserted between the coupling lens and the first deflector.

13. An optical scanning device comprising:

light-source means for emitting a beam;

first imaging means for causing the beam emitted by said light-source means to image at a predetermined position;

deflecting means for receiving the beam from said first imaging means and performing scanning with the beam; and second imaging means for causing the beam from said deflecting means to image a beam spot on a surface to be scanned, and wherein:

said light-source means, first imaging means, deflecting means and second imaging means are mounted in a box housing;

a transparent member of an approximately parallel plate is disposed detachably so as to be located between said first imaging means and deflecting means and between said deflecting means and second imaging means;

a mounting position of said second imaging means is chargeable according to whether or not said transparent member is provided; and wherein a change of the mounting position of said second imaging optical system according to whether or not the transparent member is used is achieved by a selection of the mounting position of said second imaging optical system from among a plurality of predetermined locations, and wherein said plurality of predetermined locations comprise projections and receiving members provided to the second imaging optical system and the box housing, which projections and receiving members are combined with contact therebetween to determine the mounting position of said second imaging optical system in the box housing.

14. An image forming apparatus comprising:

an optical scanning device scanning a surface of a photosensitive body with a beam so as to form a latent image on said photosensitive body;

said photosensitive body;

a developing device developing the latent image so as to form a visible image;

a transferring device transferring the visible image to a sheet recording medium; and a fixing device fixing the visible image onto the sheet recording medium, and wherein said optical scanning device comprises:

a light source;

a coupling lens coupling a beam emitted from said light source;

a light deflector deflecting the beam from said coupling lens at a uniform angular velocity;

a line-image imaging optical system disposed between said coupling lens and light deflector, and causing the beam to image a line image long along main scanning directions on or in the vicinity of a deflection reflective surface of said light deflector;

a scanning and imaging optical system causing the beam deflected by said light deflector to image a beam spot on a medium to be scanned; and an optical housing in which said light source, coupling lens, light deflector, line-image imaging optical system and scanning and imaging optical system are disposed, and contained, and wherein a plurality of holding and fixing locations for holding and fixing a light-source part comprising said light source and coupling lens are provided in at least one of said light-source part and optical housing, wherein said plurality of holding and fixing locations comprise pins and holes provided to the light source part and the optical housing, which pins and holes are combined with insertion of the pins to the holes to determine a relative spatial relationship between the light source part and the optical housing, and wherein said plurality of holding and fixing locations are those from which a selection is made as to where the light-source part is fixed, whereby a location of said light-source part is determined according to the selection, wherein the selection is made based on whether a glass cover is inserted between the coupling lens and the first deflector.

15. An image forming apparatus comprising:

an optical scanning device scanning a surface of a photosensitive body with a beam so as to form a latent image on said photosensitive body;

said photosensitive body;

a developing device developing the latent image so as to form a visible image;

a transferring device transferring the visible image to a sheet recording medium; and a fixing device fixing the visible image onto the sheet recording medium, and wherein said optical scanning device comprises:

a light-source unit emitting a beam;

a first imaging optical system causing the beam emitted by said light-source unit to image at a predetermined position;

a deflector receiving the beam from said first imaging optical system and performing scanning with the beam; and a second imaging optical system causing the beam from said deflector to image a beam spot on a surface to be scanned, and wherein:

said light-source unit, first imaging optical system, deflector and second imaging optical system are mounted in a box housing;

a transparent member of an approximately parallel plate is disposed detachably so as to be located between said first imaging optical system and deflector and between said deflector and second imaging optical system;

a mounting position of said second imaging optical system is changeable according to whether or not said transparent member is used; and wherein a change of the mounting position of said second imaging optical system according to whether or not the transparent member is used is achieved by a selection of the mounting position of said second imaging optical system from among a plurality of predetermined locations, and wherein said plurality of predetermined locations comprise projections and receiving members provided to the second imaging optical system and the box housing, which projections and receiving members are combined with contact therebetween to determine the mounting position of said second imaging optical system in the box housing.

16. The device as claimed in claim 1, wherein the plurality of fixing and holding locations permit the light source to be positioned at different positions in a direction perpendicular to an optical axis direction.

17. The device as claimed in claim 8, wherein the plurality of predetermined locations permit the light-source unit to be positioned at different positions in a direction perpendicular to an optical axis direction.

18. The device as claimed in claim 12, wherein the plurality of fixing and holding locations permit the light emitting means to be positioned at different positions in a direction perpendicular to an optical axis direction.

19. The device as claimed in claim 13, wherein the plurality of predetermined locations permit the light-source means to be positioned at different positions in a direction perpendicular to an optical axis direction.

20. The device as claimed in claim 14, wherein the plurality of fixing and holding locations permit the light source to be positioned at different positions in a direction perpendicular to an optical axis direction.

21. The device as claimed in claim 15, wherein the plurality of predetermined locations permit the light-source unit to be positioned at different positions in a direction perpendicular to an optical axis direction.

* * * * *